Aug. 26, 1930.  W. LAM  1,774,019
TRANSPLANTING POT
Filed March 26, 1928
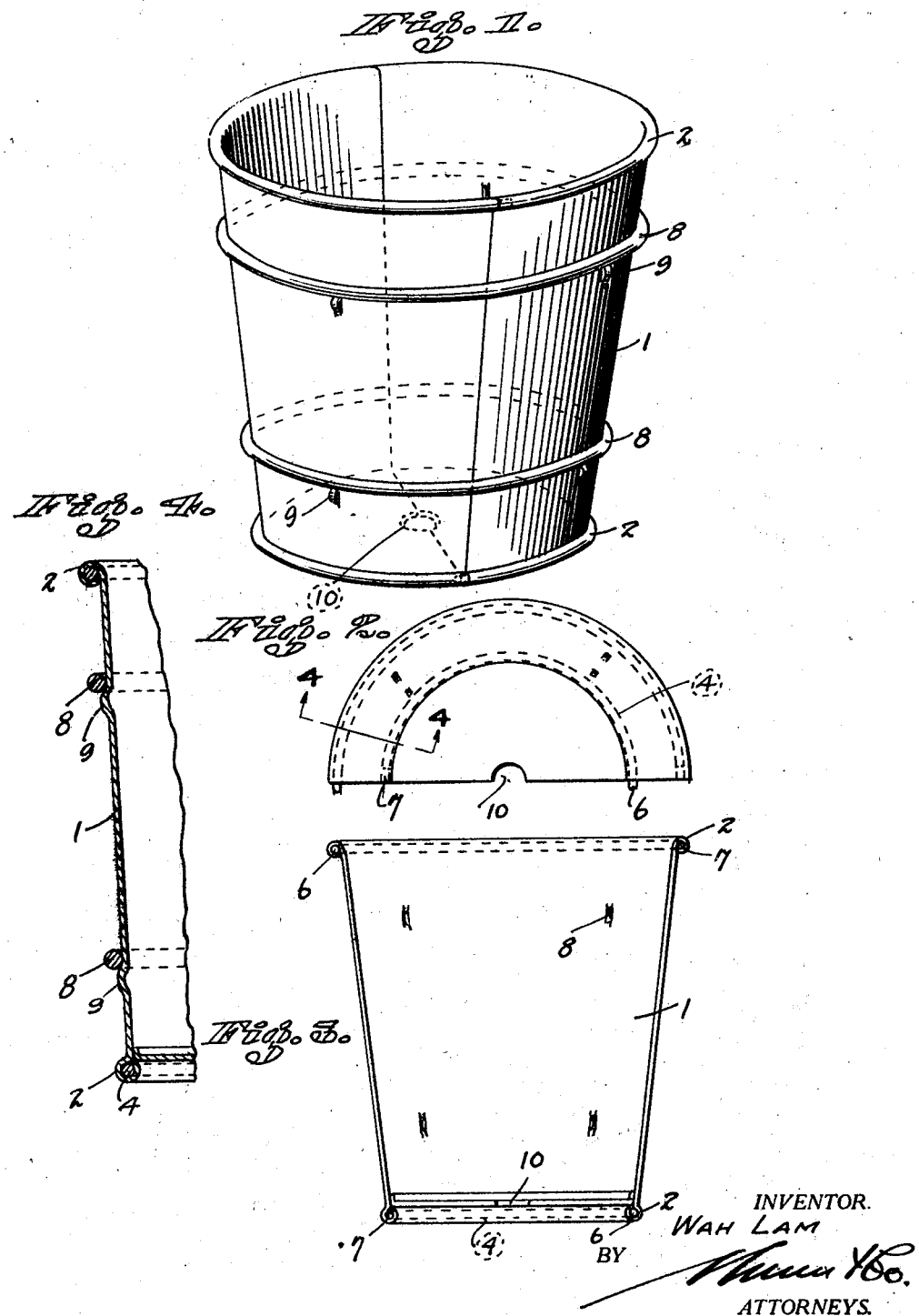
INVENTOR.
WAH LAM
BY
ATTORNEYS.

Patented Aug. 26, 1930

1,774,019

UNITED STATES PATENT OFFICE

WAH LAM, OF HONOLULU, TERRITORY OF HAWAII

TRANSPLANTING POT

Application filed March 26, 1928. Serial No. 264,627.

The present invention relates to improvements in transplanting pots, and its principal object is to provide a pot for flowers and the like which may be easily removed without disturbing the roots of the flower and the soil surrounding the same and without damaging the pot itself.

For this purpose it is intended to provide a transplanting pot consisting of preferably two sections registering with one another, and to provide removable means for holding these sections in registering relation.

Further objects and advantages of the invention will appear as the specification proceeds.

The preferred form of my invention is illustrated in the accompanying drawing, in which Figure 1 shows an assembled transplanting pot made in accordance with my invention;

Figure 2 a top view of one of the sections of my transplanting pot;

Figure 3 an inside view of said section; and

Figure 4 a fragmentary vertical section taken along line 4—4 of Figure 2.

While I have shown only the preferred form of the invention, I wish to have it understood that various changes or modifications may be made within the scope of the claims hereto attached without departing from the spirit of the invention.

In its preferred form my transplanting pot consists of two tapered pot sections 1 which register in size so that if the two are placed together in the manner shown in Figure 1 they form a complete flower pot. The top and bottom edges 2 of the pot sections are curled to provide hollow beads in which are accommodated rods 4, each rod being made to project beyond the section along one vertical edge as shown at 6 and to recede from the edge on the other side to form a recess 7 in which one of the projections 6 of the other section may be accommodated. These projections and sockets serve as guide means for bringing the two sections into registry with ease and dispatch.

The two sections when assembled are held together by means of rings 8 which may be slipped over the smaller end of the pot along the tapered wall thereof until they clamp the two sections together. Two of these rings are shown in the drawing, and these rings are held in place by small knobs 9 which are sufficiently yielding to allow the rings to be forced over the same, but prevent accidental slipping down of the rings. A hole 10 may be left in the bottom of the pot for drainage.

The manner of using this transplanting pot is easily understood from the foregoing description. To assemble the same, the two sections are brought into registry by means of the projections 6 and sockets 7, and the two rings 8 are slipped over the bottom end as far as they will go, at which time they clamp the two sections together. They are held in place by the knobs 9. When it is desired to remove the pot from the flower, the rings are forced downward, whereupon the two sections may be easily slipped apart without disturbing the earth around the roots of the flower and the roots themselves.

I claim:

1. A transplanting pot of the character described comprising a plurality of registering tapered pot sections adapted for abutting engagement so as to furnish a frusto-conical pot with smooth interior and beaded at the top and the bottom, guide means within the beads for bringing the sections into registry, rings adapted to be slipped over the small end of the assembled sections for clamping the sections together, means holding the rings against removal and a bottom resting on the lower bead.

2. A transplanting pot of the character described, comprising a plurality of registering tapered pot sections adapted for abutting engagement so as to furnish a frusto-conical pot with smooth interior and beaded at the top and the bottom, guide means within the beads for bringing the sections into registry, rings adapted to be slipped over the small end of the assembled sections for clamping the sections together, means holding the rings against removal, and a bottom resting on the lower bead, the bottom being perforated to allow of drainage.

WAH LAM.